United States Patent [19]

Ueno et al.

[11] Patent Number: 4,478,918
[45] Date of Patent: Oct. 23, 1984

[54] FUEL CELL STACK

[75] Inventors: Mitsushi Ueno; Tadanori Maoka, both of Yokohama; Kenji Murata, Tokyo; Tamotsu Shirogami, Yamato, all of Japan

[73] Assignee: Tokyo Shibaura Denki Kabushiki Kaisha, Kawasaki, Japan

[21] Appl. No.: 449,998

[22] Filed: Dec. 15, 1982

[30] Foreign Application Priority Data

Dec. 25, 1981 [JP] Japan ............................... 56-212385
Jun. 15, 1982 [JP] Japan ............................... 57-102810

[51] Int. Cl.³ ...................... H01M 2/08; H01M 2/14; H01M 8/04
[52] U.S. Cl. ........................................ 429/38; 429/36; 429/26
[58] Field of Search ................................ 429/26, 34–38

[56] References Cited

U.S. PATENT DOCUMENTS

| | | | |
|---|---|---|---|
| 3,623,913 | 11/1971 | Adlhart et al. | |
| 3,834,945 | 9/1974 | Jensen | 136/161 |
| 3,923,546 | 12/1975 | Katz et al. | 429/26 |
| 3,964,929 | 6/1976 | Grevstad | 136/86 |
| 3,964,930 | 6/1976 | Reiser | 136/86 |
| 3,990,913 | 11/1976 | Tuschner | |
| 4,157,327 | 6/1979 | Martin et al. | 260/42.27 |
| 4,233,369 | 11/1980 | Breault et al. | 429/26 |
| 4,345,009 | 8/1982 | Fahle et al. | 429/37 |

FOREIGN PATENT DOCUMENTS 461660 2/1973 Australia .

OTHER PUBLICATIONS

Proceedings of the 13th Intersociety Energy Conversion Engineering Conference (1978) p. 735.

Primary Examiner—Brian E. Hearn
Assistant Examiner—Stephen J. Kalafut
Attorney, Agent, or Firm—Oblon, Fisher, Spivak, McClelland & Maier

[57] ABSTRACT

A fuel cell stack has a plurality of stacked unit cells, each consisting of a pair of gas diffusion electrodes with a matrix containing an electrolyte solution interposed between them, with an interconnector having a fuel gas passage on one surface and an oxidizing gas agent passage on the other surface interposed between each pair of adjacent unit cells. One out of every three to five interconnectors is a one-piece-molded product which has at least one cooling pipe embedded in it and which provides an excellent cooling effect. The fuel cell stack stably provides a high output voltage over a long period of operation time.

11 Claims, 5 Drawing Figures

FUEL CELL STACK

BACKGROUND OF THE INVENTION

1. Field of the Invention

The present invention relates to a fuel cell stack wherein a plurality of unit cells are stacked with interconnectors interposed therebetween and, more particularly, to a fuel cell stack wherein cooling pipes for circulating a coolant are embedded in at least one of the interconnectors.

2. Description of the Prior Art

A fuel cell is conventionally known as a power generator to obtain direct current power by the electrochemical reaction between a gas which is easily oxidized, such as hydrogen, and a gas which has an oxidizing ability, such as oxygen. In a fuel cell of this type, a matrix containing an electrolyte solution is generally interposed between a pair of gas diffusion electrodes. The outer surface of one electrode is brought into contact with a gas (fuel) containing hydrogen, while the outer surface of the other electrode is brought into contact with a gas (oxidizing agent) containing oxygen, with a load connected between both electrodes. Then, direct current power is supplied to the load. A catalyst layer carrying platinum or the like is generally formed on each of the gas diffusion electrodes so as to facilitate the reaction. A power generator is known which comprises a plurality of series-connected unit cells, each unit cell comprising a fuel cell as described above.

The fuel cells which are series-connected as unit cells generally have a configuration as shown in FIG. 1. More specifically, in a unit cell 4, a matrix 3 containing an electrolyte solution is interposed between a pair of gas diffusion electrodes 2a and 2b having catalyst layers 1a and 1b formed on their inner surfaces. Such unit cells 4 are stacked with conductive interconnectors 5 comprising carbon plates or the like interposed therebetween. Grooves 6 for passing the fuel gas therealong are formed on one surface of each interconnector 5 to extend in the direction indicated by arrow P. Grooves 7 for passing the oxidizing gas therealong are formed on the other surface of each interconnector 5 to extend in the direction indicated by arrow Q perpendicular to that indicated by arrow P. In some interconnectors 5, for example, in one of every three interconnectors 5, cooling pipes 8 are embedded for preventing a temperature rise in the cell due to heat generated by the electromotive reaction.

An interconnector 5 with the cooling pipes 8 embedded therein generally has a configuration as shown in FIG. 2. Interconnector mates 11 and 12 are separately molded to have grooves 7 and 6 respectively on one surface of each thereof. The interconnector mates 11 and 12 are adhered together with a conductive adhesive resin such that the grooves 7 and 6 may face outward and be perpendicular to each other. A plurality of grooves 13 are formed on the other surface of the interconnector mate 11 which faces the interconnector mate 12. A plurality of U-shaped cooling pipes 8 coated with insulating films on their outer surfaces are embedded in a sealant 14 within the grooves 13.

A fuel cell stack can be cooled by incorporating such interconnectors having cooling pipes embedded therein as described above and by circulating a coolant through these cooling pipes. However, such an interconnector has a low cooling effect and fails to improve performance of the fuel cells as will be described below.

The interconnector as described above is prepared by adhering together a pair of interconnector mates 11 and 12 with a conductive adhesive resin. In order to prevent warpage during molding of the interconnector mates 11 and 12, they must have a minimum thickness of 5 mm. Further, the interconnector mate 11 must have grooves for embedding the cooling pipes 8 therein in addition to the grooves 7 for circulating the oxidizing gas. For this reason, the interconnector mate 11 must have a greater thickness than that of the interconnector mate 12 in order to guarantee its mechanical strength. For example, if the cooling pipes 8 have a diameter of 3 mm, the grooves 13 in which they are embedded must have a depth of about 3.5 mm. If the grooves 7 have a depth of 2 mm and the remaining portion of the interconnector mate 11 has a thickness of 2.5 mm, the interconnector mate 11 must have an overall thickness of 8 mm. Then, the overall thickness of the interconnector obtained by adhering the two interconnector mates together becomes 13 mm. However, allowing a safety factor, the thickness of the interconnector must be about 15 mm. If an interconnector has such a thickness, the distance between its surface and the cooling pipes 8 increases, resulting in an increase in heat resistance and a low cooling effect. When the cooling pipes 8 are embedded in the grooves 13 of the interconnector mate 11, a conductive thermosetting adhesive such as a carbonaceous material or epoxy resin is used as a sealant. This type of adhesive has unsatisfactory fluidity and tends to form air voids between the inner surfaces of the grooves 13 and the cooling pipes 8. A number of voids are also formed within the adhesive layer by evaporation of a solvent when the adhesive is thermoset. This decreases the effective heat transfer area and also results in a low cooling effect. According to experiments conducted by the present inventors, when a current of 200 mA/cm$^2$ density was flowed in a conventional fuel stack incorporating the interconnectors as described above, the temperature of the coolant at the outlet port of the cooling pipe was 170° C. However, a maximum temperature of 220° C. was measured at the surface of the interconnector. A temperature difference of 50° C. thus observed indicates the low cooling effect of the cooling pipes.

As a conductive thermosetting adhesive, only a conductive thermosetting adhesive of epoxy resin type containing silver is currently known. The upper limit of the temperature of such an adhesive is as low as 170° to 180° C. Therefore, if the output current density of the cell increases, various problems are caused including easy separation of the interconnector mates, a decrease in the electric conductivity at the adhered surfaces of the interconnector mates, nonuniform current distribution of the interconnector, or a significant increase in the resistance loss.

Since the interconnector mates have different thicknesses, the resultant interconnector will inevitably warp.

SUMMARY OF THE INVENTION

It is an object of the present invention to provide a fuel cell stack which has an interconnector providing an excellent cooling effect and which is therefore capable of stably providing a high output over a long period of operation time.

A fuel cell stack according to the present invention has a plurality of stacked unit cells, each comprising a pair of gas diffusion electrodes with a matrix containing an electrolyte solution interposed therebetween, each pair of adjacent unit cells having an interconnector interposed therebetween, and each interconnector having a fuel gas passage on its one surface and an oxidizing agent gas passage on its other surface. At least one of the interconnectors is a one-piece-molded product in which at least one cooling pipe is embedded.

In a fuel cell stack of the configuration as described above according to the present invention, since the cooling interconnector is a one-piece-molded product in which at least one cooling pipe is embedded, the thickness thereof can be decreased as compared to a conventional interconnector manufactured by adhering a pair of interconnector mates together. As a result, heat generated by the fuel cell may be effectively transferred from the surface of the interconnector to the coolant within the cooling pipe, thereby providing an excellent cooling effect upon the fuel cell. For example, if the grooves for a gas passage have a depth of 2 mm, the cooling pipes have a diameter of 3 mm, and a distance between the bottom of the grooves and the cooling pipes is 1.5 mm, the overall thickness of the interconnector is 10 mm, which is smaller than that of a conventional interconnector. An interconnector of the present invention can shorten the distance between its surface and the cooling pipes and decrease its heat resistance as compared to the conventional interconnector. The cooling effect of the cooling pipes may be significantly improved, and a high output may be obtained from the fuel cell. Since the cooling pipes are embedded within the interconnector, the surface of the pipes are in tight contact with the material of the interconnector, unlike in a conventional interconnector wherein air voids are formed at the surface of the cooling pipes to degrade their cooling effect. Furthermore, since a sealant is not interposed between the cooling pipes and the material of the interconnector, air voids may not be formed during thermoset of the sealant and heat resistance may not therefore be increased. The interconnector of the present invention does not adopt a structure wherein a pair of interconnector mates are adhered together with an adhesive, so that the electric conductance at the interface may not be decreased with a rise in temperature. The interconnector of the present invention can provide stable performance over a long period of operation time.

DETAILED DESCRIPTION OF THE PREFERRED EMBODIMENT

Examples of the present invention will now be described with reference to the accompanying drawings.

EXAMPLE 1

Figure 3:
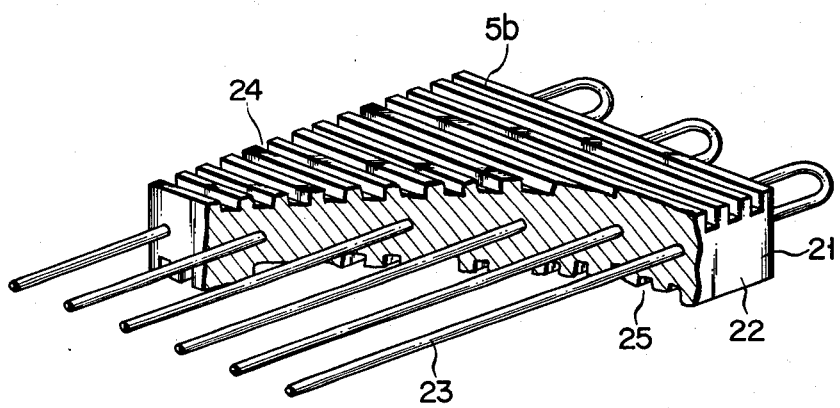
FIG. 3 is a partially cutaway perspective view of an interconnector according to the present invention.

FIG. 3 is a partially cutaway perspective view of an interconnector with cooling pipes to be assembled in a fuel cell stack according to the present invention. Referring to FIG. 3, an interconnector 21 comprises an interconnector body 22 and a plurality of U-shaped cooling pipes 23 embedded therein. The interconnector body 22 had a thickness of 10 mm and was prepared by molding under pressure a mixture of carbon and a thermosetting resin into a plate form and heat-treating. The cooling pipes 23 were obtained by bending copper pipes having a length of 30 cm, an outer diameter of 3.0 mm and an inner diameter of 2.5 mm into a U-shape having a radius of curvature of 1 cm, and by coating an insulating film over the surface of each copper pipe. The insulating film consisted of polytetrafluoroethylene and was coated on each copper pipe in the following manner. Each copper pipe was inserted into a polytetrafluoroethylene tube having an outer diameter of 3.5 mm and an inner diameter of 3.1 mm, and the tube was thermally shrunk at about 400° C. Three cooling pipes 23 thus prepared were embedded at equal intervals of 2 cm in an interconnector body 22 during its molding process. Grooves 24 and 25 for gas passage having a depth of 2 mm were formed on two surfaces of the interconnector body 22 to be perpendicular to each other. The grooves 24 and 25 may be formed during molding of the interconnector body 22 or during a subsequent cutting process.

Figure 1:
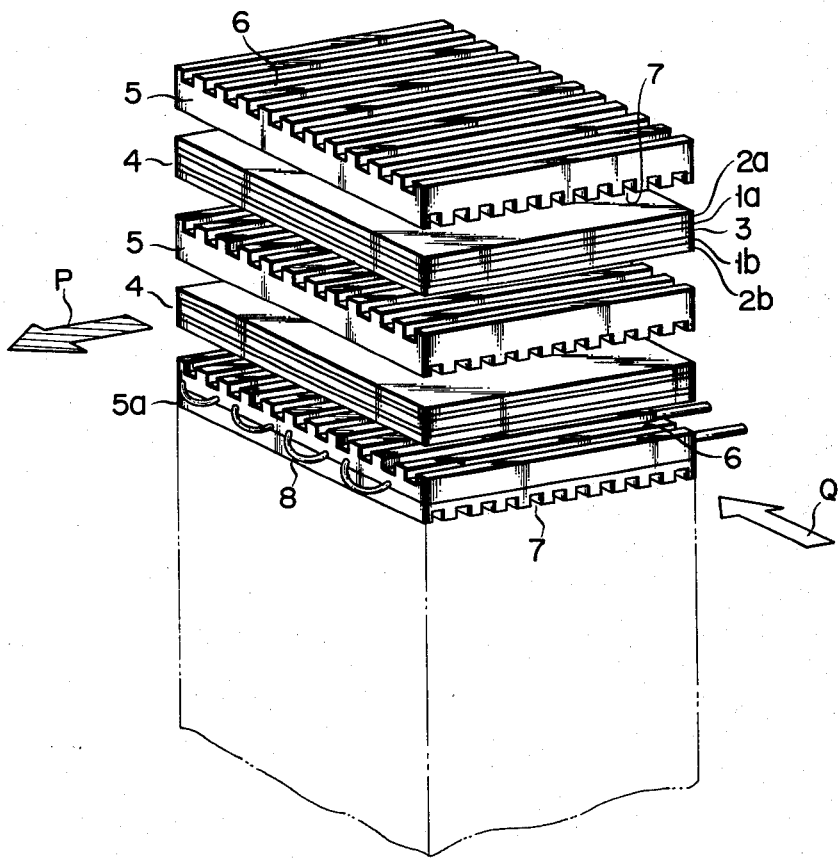
FIG. 1 is a perspective view showing the configuration of a conventional fuel cell stack.

A fuel cell stack of the present invention is obtained by stacking unit cells as shown in FIG. 1 with an interconnector of the configuration as described above interposed between each pair of adjacent unit cells. It is to be noted here that all of the interconnectors need not have the cooling pipes; one out of every four interconnectors, for example, may have cooling pipes and the remaining interconnectors need not have cooling pipes. Phosphoric acid was used as an electrolyte solution of the unit cells.

The electromotive reaction was performed at a current density of 200 mA/cm$^2$ using the fuel cell stack of the configuration as described above and using hydrogen of 2.5 l/min as a fuel gas and air of 6.5 l/min as an oxidizing gas. During the electromotive reaction, measurements were made of the temperature at the outlet port of the cooling water circulated within a cooling pipe embedded in the interconnector 21, the maximum temperature at the center of the surface of an interconnector without cooling pipes which is farthest from the interconnector with cooling pipes, and the surface temperature of the interconnector with cooling pipes. The temperature of the cooling water at the inlet port of the cooling water was 160° C.

Figure 2:
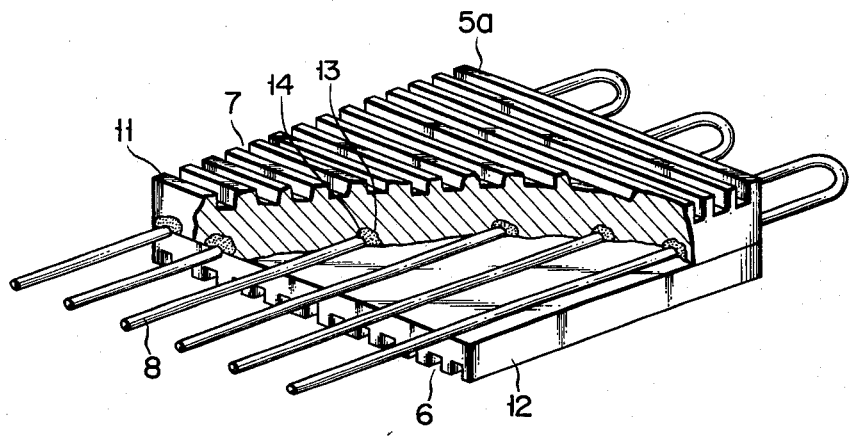
FIG. 2 is a partially cutaway perspective view of a conventional interconnector.
Figure 4:
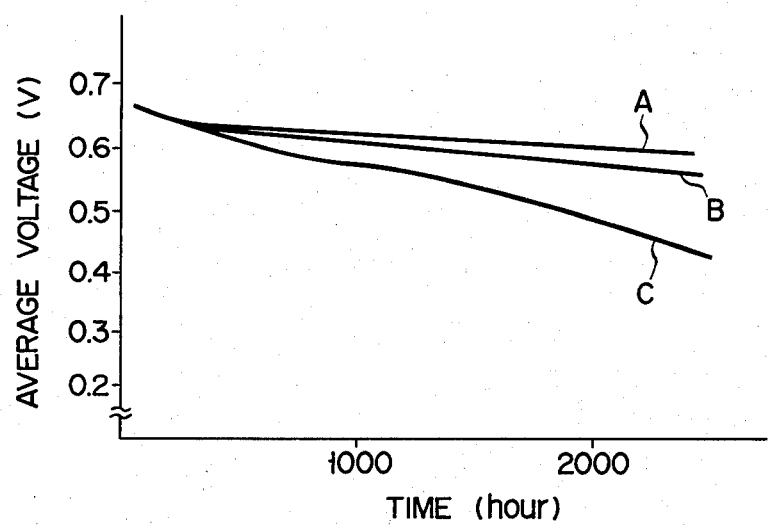
FIG. 4 is a graph showing average voltage as a function of time for fuel cell stacks (Examples 1 and 2) of the present invention and for a conventional fuel cell stack.

As a control, similar measurements were made under the same conditions and at the same locations for a conventional fuel cell stack incorporating an interconnector of the type shown in FIG. 2, wherein a pair of interconnector mates are adhered together with a conductive resin, and cooling pipes are embedded in a carbonaceous resin within grooves formed in one surface of one interconnector mate which is to be brought into contact with the other interconnector mate. The obtained results are shown in the Table below. A change in the output voltage over time per unit cell was measured and the obtained results are shown in the graph of FIG. 4. Curve B corresponds to a fuel cell stack of Example 1, while curve C corresponds to a conventional fuel cell stack.

As may be seen from the Table below, the difference between the temperature of the cooling water at the outlet port of the cooling pipe and the maximum temperature of the interconnector is 25° C. for the fuel cell stack of the present invention, while it is 50° C. for the control stack. This indicates that the fuel cell stack of the present invention is superior to the conventional fuel cell stack in cooling effect. This is considered to be attributable to an improvement in thermal conductivity which is, in turn, attributable to a smaller thickness of the interconnector with cooling pipes, a smaller thickness of the insulating film coated on the cooling pipe, and good adhesion strength between the cooling pipes and the insulating films. As may be seen from FIG. 4, in the fuel cell stack of the present invention, the decrease in the output voltage over time is smaller than that in the control. Since the maximum temperature does not exceed 200° C. in the fuel cell stack of the present invention, evaporation of the phosphoric acid used as the electrolyte solution is small and the decrease in the surface area of the catalyst is small. In contrast to this, in the fuel cell stack of the control, since the maximum temperature exceeds 200° C., evaporation of the electrolyte solution is accelerated, mobility of hydrogen ions is decreased, and the decrease in the surface area of the catalyst is accelerated, resulting in a great voltage loss. The fuel cell stack of the present invention underwent no changes after operating for 1,000 hours, while in the fuel cell stack of the control gaps formed between the cooling pipes and the grooves, and discoloration of the conductive adhesive occurred.

In the fuel cell stack of Example 1 described above, the outer surfaces of the cooling pipes are coated with heat-shrinkable fluoropolymer tubes as insulating materials. However, such a heat-shrinkable fluoropolymer tube is extremely difficult to process into a thickness of 0.1 mm or less. Therefore, the cooling pipes obtained by coating with such tubes do not necessarily provide an optimum cooling effect.

In order to obtain an improved cooling effect, the outer surface of a cooling pipe is coated with an electrostatic-coated film of fluorocarbon polymer in a preferred embodiment of the present invention. More preferably, the electrostatic-coated film is heat treated at a temperature higher than the softening point of the fluorocarbon polymer so as to prevent formation of pin holes. Examples of a fluorocarbon polymer may include polytetrafluoroethylene, polyfluoroethylenepropylene, polychlorofluoroethylene, and polyfluoroethyleneethylene copolymer.

Electrostatic coating of a fluorocarbon onto the outer surface of the cooling pipe is performed by positively charging a metal cooling pipe and spraying a negatively charged fluorocarbon polymer powder onto the cooling pipe with a blower. If the fluorocarbon the interconnector and the cooling pipes. In order to prevent this, heat treatment is performed to adhere the powder particles to each other and to prevent formation of pin holes. A fluorocarbon polymer film thus obtained has a thickness of about 0.015 mm (15 μm), which is about 1/10 that of an insulating film formed by a heat-shrinkable tube. Depending upon the electrostatic coating technique adopted or the properties of the polymer, an insulating film of a sufficient thickness may not be adequately formed by a single coating process due to formation of pin holes or the like. In such a case, an insulating layer having satisfactory insulating properties may be formed by performing the electrostatic coating process twice. Even in this case, the thickness of the insulating film remains about 0.030 mm (30 μm) which is far smaller than in the conventional case. The adhesion strength between the cooling pipe and the insulating film obtained in this manner is excellent. With a cooling pipe on which an electrostatic-coated film is formed, heat may be effectively transferred from the interconnector to lower its surface temperature to a temperature lower than that attainable with a conventional cooling pipe. The performance of the fuel cell stack of the present invention may thus be significantly improved. Formation of the insulating film by electrostatic coating costs about 1/10 the cost of using a conventional heat-shrinkable polymer tube. Furthermore, electrostatic coating may be performed simultaneously for a number of cooling pipes so as to facilitate mass production and lower the manufacturing cost of the fuel cell stacks. Example 2 to be described below represents a case wherein the surface of a cooling pipe is coated with an electrostatic-coated film.

EXAMPLE 2

A fuel cell stack was prepared in a similar manner to that in Example 1 except that a cooling pipe was coated with a polytetrafluoroethylene film by electrostatic coating. Similar measurements as those made in Example 1 were made. The surface of the cooling pipe was coated with a polytetrafluoroethylene film in the following manner. First, the surface of a copper pipe similar to that used in Example 1 was subjected to electrostatic coating of polytetrafluoroethylene and was then heat-treated at 400° C. for 20 minutes. These steps were repeated again. The resultant polytetrafluoroethylene film had a thickness of 0.03 mm. The measurement results are shown in the Table below and the change in output voltage as a function of time per unit cell is shown by curve A in FIG. 4.

As may be seen from the Table and FIG. 4, a fuel cell stack of Example 2 which used a cooling pipe having an electrostatic-coated film provides an excellent cooling effect.

TABLE

|  | Temperature at inlet port of cooling water (°C.) | Temperature at outlet port of cooling water (°C.) | Surface temperature of interconnector having cooling pipes (°C.) | Maximum temperature of interconnector (°C.) |
| --- | --- | --- | --- | --- |
| Example 1 | 160 | 170 | 180 | 195 |
| Example 2 | 160 | 170 | 180 | 190 |
| Control | 160 | 165 | 195 | 215 |

Figure 5:
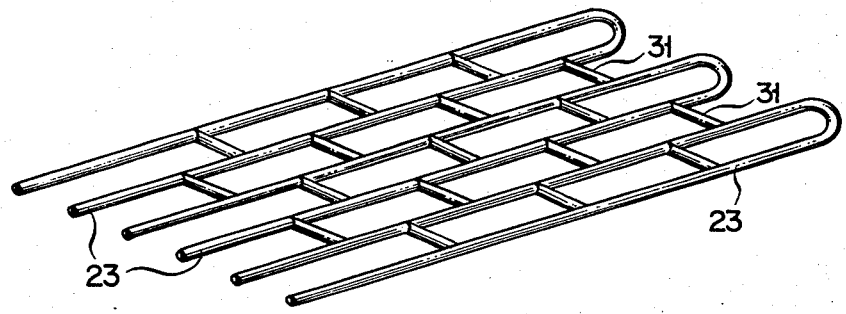
FIG. 5 is a perspective view showing cooling pipes interconnected with bridges.

For the purpose of reinforcement, the cooling pipes to be embedded in the interconnector may be connected by a plurality of bridges 31 as shown in FIG. 5. Coating of the insulating film by electrostatic coating may be in particular conveniently adopted for the cooling pipes of this configuration. That is, electrostatic coating may be performed after the bridges are welded to the cooling pipes.

What we claim is:

1. A fuel cell stack having:
   a plurality of stacked unit cells, each of said unit cells consisting of a pair of gas diffusion electrodes and a matrix containing an electrolyte solution interposed between said electrodes, and
   an interconnector having a fuel gas passage on one surface and an oxidizing agent gas passage on the other surface interposed between each pair of adjacent ones os said unit cells,
   wherein at least one of said interconnectors includes a one-piece-molded product and at least one cooling pipe coated with an insulating film embedded in said one-piece-molded product.

2. A fuel cell stack according to claim 1, wherein the electrolyte solution is phosphoric acid.

3. A fuel cell stack according to claim 2, wherein the gas passages comprise grooves.

4. A fuel cell stack according to claim 3, wherein said grooves as said fuel gas passage and said grooves as said oxidizing gas passage extend perpendicularly to each other.

5. A fuel cell stack according to claim 1, wherein said interconnectors consist of carbon and thermosetting resin.

6. A fuel cell stack according to claim 1, wherein said insulating film is an electrostatic-coated film.

7. A fuel cell stack according to claim 6, wherein said insulating film consists of a fluorocarbon polymer.

8. A fuel cell stack according to claim 7, wherein said insulating film is formed by electrostatic coating of the fluorocarbon polymer and subsequent heat treatment at a temperature higher than a softening point thereof.

9. A fuel cell stack according to claim 7, wherein the fluorocarbon polymer is polytetrafluoroethylene.

10. A fuel cell stack according to claim 6, wherein said elecrostatic-coated film is formed by a plurality of electorstatic coating processes.

11. A fuel cell stack according to claim 6, wherein said cooling pipes comprise a plurality of U-shaped pipes which are connected to each other by bridges.

* * * * *